(No Model.)
G. W. PRESSEY.
SHAFT SUPPORT FOR VEHICLES.
No. 497,602. Patented May 16, 1893.
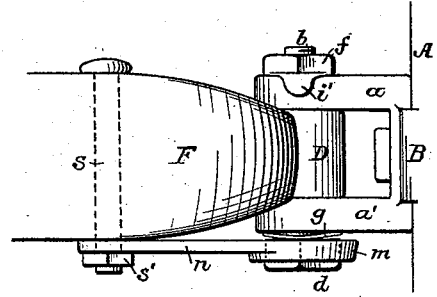
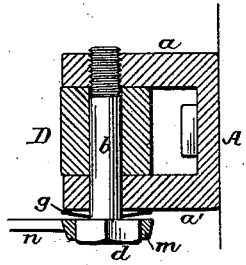
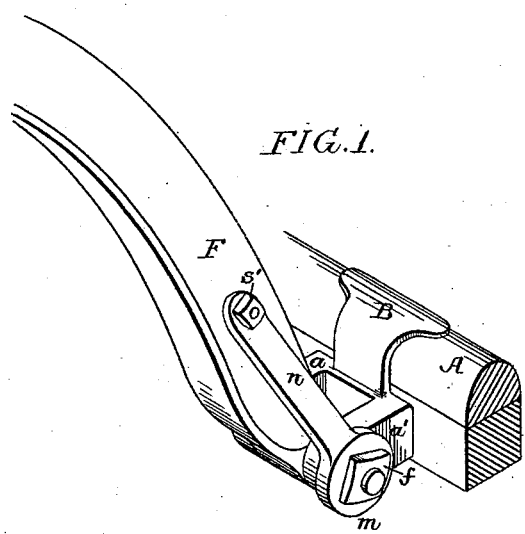
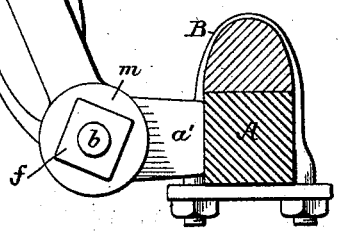
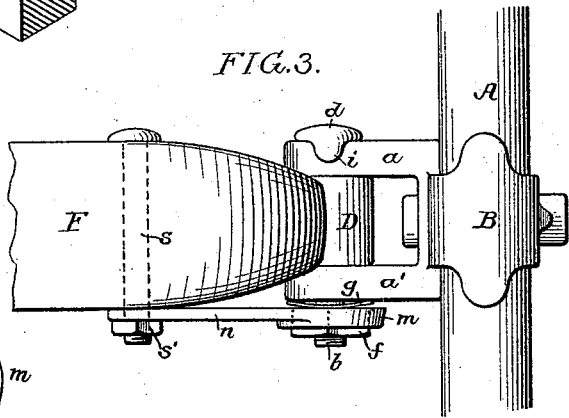
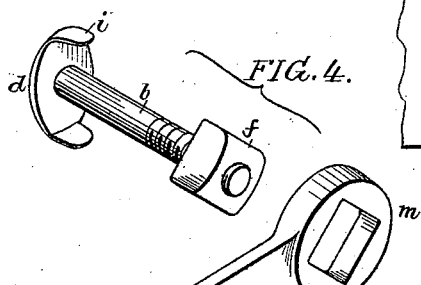
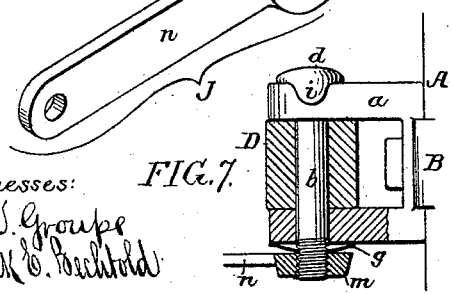
Witnesses:
A. V. Groupe
Frank C. Bechtold
Inventor:
George W. Pressey
by his Attorneys
Howson & Howson

UNITED STATES PATENT OFFICE.

GEORGE W. PRESSEY, OF HAMMONTON, NEW JERSEY.

SHAFT-SUPPORT FOR VEHICLES.

SPECIFICATION forming part of Letters Patent No. 497,602, dated May 16, 1893.

Application filed February 20, 1893. Serial No. 463,076. (No model.)

*To all whom it may concern:*

Be it known that I, GEORGE W. PRESSEY, a citizen of the United States, and a resident of Hammonton, Atlantic county, New Jersey, have invented certain Improvements in Shaft and Pole Supporting Devices for Vehicles, of which the following is a specification.

The object of my invention is to so construct a thill coupling for the shafts or poles of vehicles, or to provide said coupling with such an attachment that when the shaft or pole is lifted, it will be retained in the elevated position when the carriage is not in use, or when it is desired to stand a number of carriages closely together or in order that the horse or team can be readily gotten into or out of position in harnessing or unharnessing. The device in the preferred form also serves as an efficient lock for the nut on the thill bolt and prevents any rattling of the thills when the vehicle is in use.

In the accompanying drawings:—Figure 1, is a perspective view of an ordinary form of thill coupling with my improved attachment. Fig. 2, is a side view of the same, with the axle in section. Fig. 3, is a plan or top view of the coupling provided with the attachment. Fig. 4, is a perspective view representing the thill bolt and nut and the attachment made in accordance with my invention; and Figs. 5, 6, 7 and 8, are views illustrating other adaptations of my invention.

A represents part of the axle of a vehicle, and B the usual clip or equivalent device applied to the axle, and having projecting lugs or ears $a$ $a'$ between which is fitted the thill eye D which is secured to the shaft or pole F of the vehicle in the ordinary manner, said thill eye being hung to the ears $a$ $a'$ by means of a transverse bolt $b$ which has at one end a head $d$ bearing against the ear $a$ and at the other end a nut $f$ which usually bears against the opposite ear $a'$, but which, in the present instance, bears upon a slightly concaved or dished spring washer $g$ interposed between the ear and nut for a purpose described hereinafter. The bolt $b$ may be prevented from turning in the usual way by forming upon the same a square or other polygonal shaped neck adapted to a correspondingly shaped opening in the ear $a$, but I prefer to provide the bolt with an elongated head $d$ having at each end lugs or fins $i$ which overlap the ear at top and bottom and thus effectually prevent any turning of the bolt.

To the nut $f$ is adapted the head $m$ of a wrench J, which has a stem $n$ extending up alongside of the shaft or pole F, and secured thereto in any suitable manner, as for instance by means of a bolt $s$ passing through the shaft or pole and through an opening in the end of the stem, this bolt being provided with a nut $s'$, or, in place of this method of fastening, a simple screw, pin, clip, or other fastening device may be employed.

Before applying the wrench J to the nut $f$ the latter is screwed up on the bolt to such an extent that the thill eye will play freely between the ears $a$ $a'$ of the clip when the shaft or pole is in the position which it assumes when in use, the wrench being then applied to the nut and the outer end of the stem $n$ secured to the shaft or pole in the manner described. When the shaft or pole is lifted, therefore, in order to be out of the way when the vehicle is not in use or in getting the horse or team into position to be harnessed, or out of the way after unharnessing, the nut $f$ will be turned upon the bolt $b$ to such an extent as to impart pressure to the opposite ears $a$ $a'$ of the clip and clamp the thill eye between them, the friction thus exerted upon said thill eye being sufficient to prevent the dropping of the pole or shaft from its elevated position, without, however, interfering with the ready drawing down of the shaft or pole by hand when desired, this operation again slackening the nut so as to permit the free movement of the shaft or pole when the vehicle is in use. The spring washer $g$ interposed between the clip ear and the nut serves to prevent any rattling of the nut or bolt without interfering with the exertion of sufficient pressure upon the clip ear to properly clamp the thill eye when the shaft or pole is raised. The wrench J also serves as an effectual means of locking the nut $f$ and preventing the loosening or loss of the same. When the parts become loose by reason of wear they can be readily tightened again by first removing the wrench, then tightening up the nut to the required extent, and then reapplying the wrench and securing it in place.

In carrying out my invention I prefer to apply the wrench to the inner side of each shaft, one of the thill bolts, in this case, being provided with a right hand thread and nut and the other with a left hand thread and nut so that both nuts will be tightened simultaneously on the lifting of the shafts.

If desired the wrench may be applied to the head of the thill bolt, and the nut may be prevented from turning in any available way, as for instance by forming lugs $i'$ thereon, as shown in Fig. 5, or the threaded stem of the bolt may be applied to a threaded opening in one of the ears, as shown in Fig. 6, so as to render the use of a nut unnecessary, or in other cases the wrench may have a threaded opening so as to constitute a nut, as shown in Fig. 7, or when the nut is prevented from turning the thill bolt may be caused to turn with the thill eye, by confining it to the latter in any available way, for instance, by making that portion which is adapted to the thill eye of square or other angular shape, as shown in Fig. 8.

It will be evident that my invention, while providing for the effective attainment of the object sought, involves the use of but very few additional parts, and these of the simplest and cheapest construction, the device being wholly automatic in its action and providing for all contingencies which are likely to arise in the use of devices of this class.

The objection to those forms of my invention which are shown in Figs. 6 and 8, is that they require reconstruction of the other parts of the thill coupling, whereas the embodiments of my invention represented in the other figures of the drawings are applicable to ordinary couplings without any change in the latter.

Having thus described my invention, I claim and desire to secure by Letters Patent—

1. The combination in a thill coupling, of the thill eye and supporting ears, with the bolt and nut constituting the elements whereby the thill eye is hung to said ears, and with means for preventing the turning of one of said elements, and for causing the other to turn with the shaft or pole as the latter is raised and lowered, whereby the thill eye is clamped as the shaft or pole is raised, and loosened as the same is lowered, substantially as specified.

2. The within described thill coupling attachment whereby the shaft or pole is supported in the elevated position when raised, said attachment consisting of a wrench confined to the thill bolt or nut, and secured to the shaft or pole so as to tighten the thill eye as said shaft or pole is raised, substantially as specified.

3. The within described attachment for thill couplings, said attachment consisting of a wrench having a head with opening for the reception of the head or nut of the thill bolt, and a stem secured to the shaft or pole, whereby the thill bolt or nut will be turned as said shaft or pole is raised or lowered, substantially as specified.

4. The within described attachment for thill couplings, said attachment consisting of a wrench adapted to the thill bolt or nut, and a bolt and nut whereby the stem of said wrench is secured to the shaft or pole so that the thill eye will be tightened as said shaft or pole is raised, substantially as specified.

5. The combination of the shaft or pole and its thill eye, the clip having projecting ears, the thill bolt having a head or nut, with fins overlapping one of said ears to prevent turning, and a wrench confined to said bolt head or nut and secured to the shaft or pole so as to tighten the thill eye as said shaft or pole is raised, substantially as specified.

6. The combination of the shaft or pole and its thill eye, the clip having projecting ears, the thill bolt and its nut, a spring washer interposed between the bolt head or nut and one of the ears of the clip, and a wrench confined to said bolt head or nut and secured to the shaft or pole, substantially as specified.

In testimony whereof I have signed my name to this specification in the presence of two subscribing witnesses.

GEORGE W. PRESSEY.

Witnesses:
WM. L. BLACK,
H. E. ANDREWS.